Patented Feb. 13, 1934

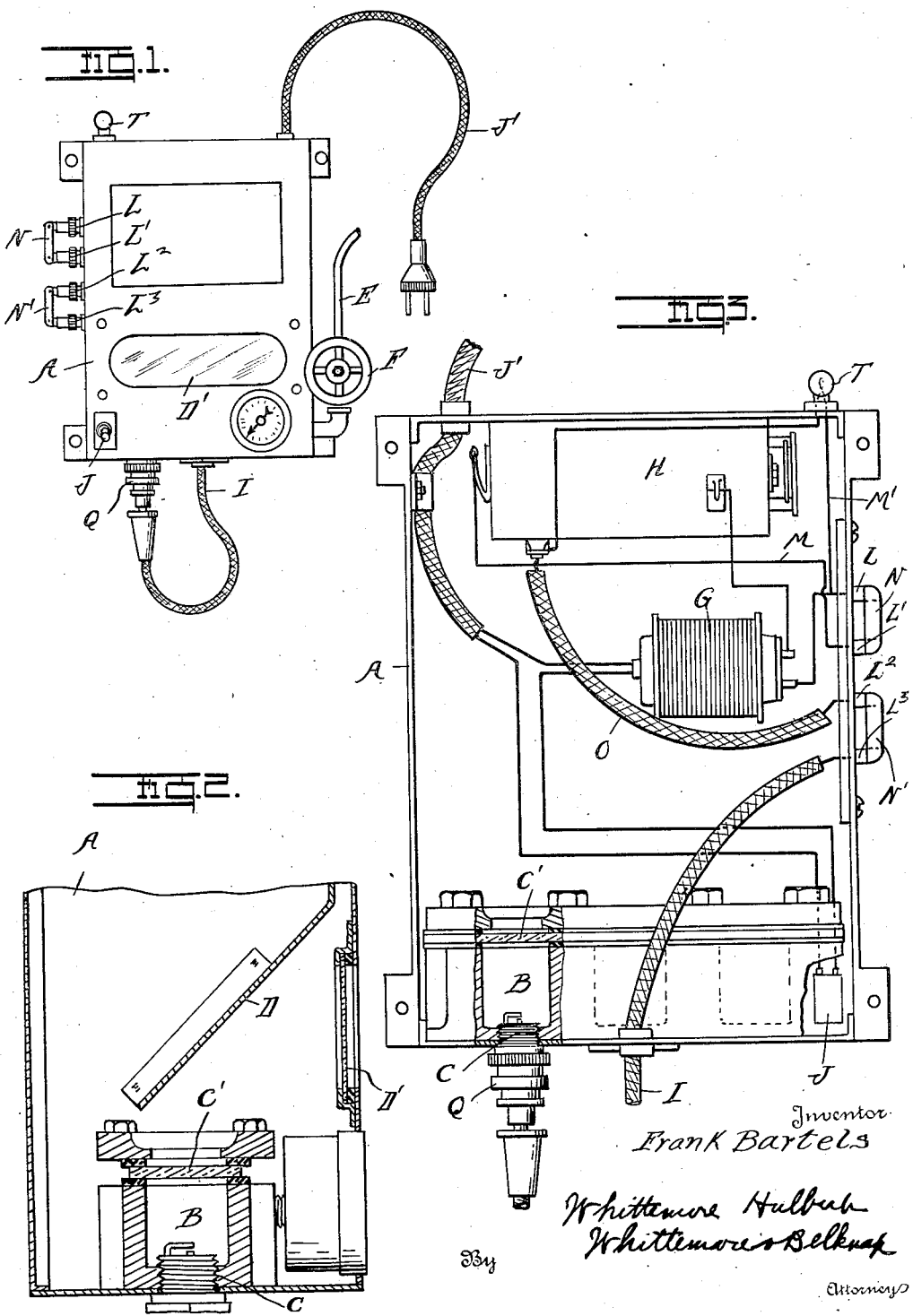

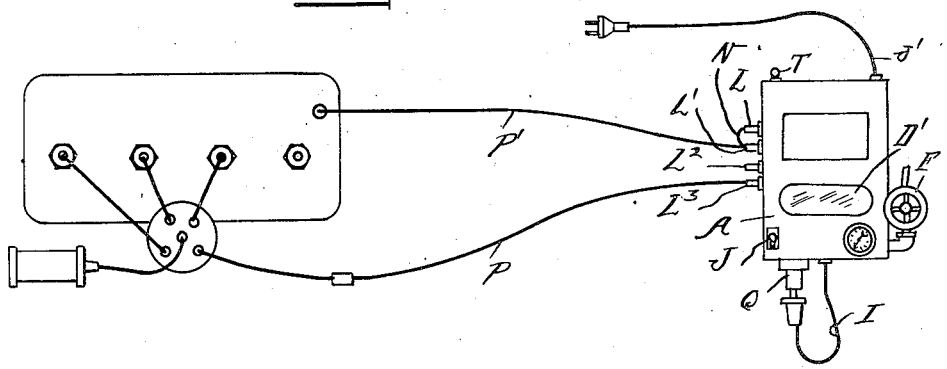
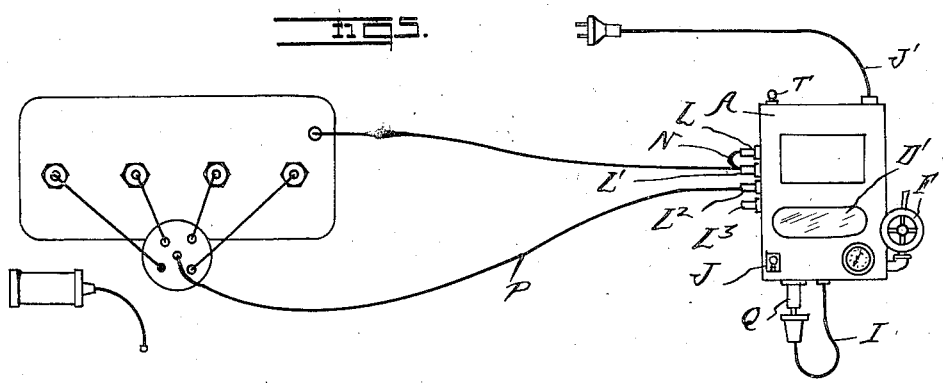
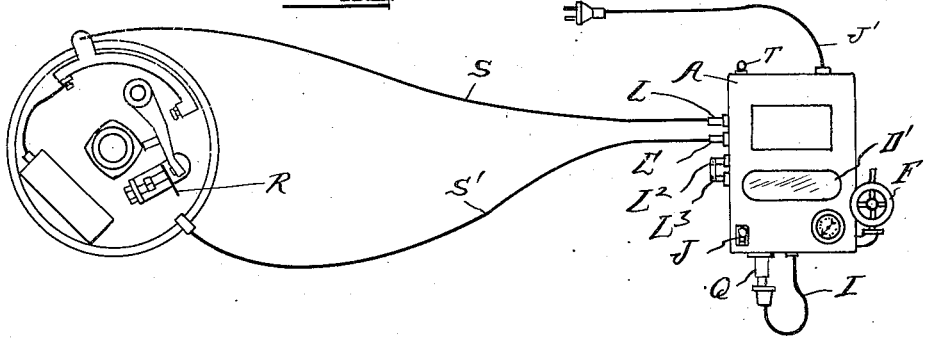

1,946,518

UNITED STATES PATENT OFFICE 1,946,518

IGNITION TESTER

Frank Bartels, Sacramento, Calif., assignor to Defiance Spark Plugs, Incorporated, Toledo, Ohio, a corporation of Ohio Application December 5, 1932. Serial No. 645,843

6 Claims. (Cl. 175—183)

The invention relates to apparatus for testing the ignition of internal combustion engines and it is the object of the invention to obtain a construction which may be readily used, first, for the testing of the spark plugs; second, for the testing of other parts of the ignition system.

In the present state of the art spark plug testers have been devised which are so constructed that the spark between the electrodes may be observed while subjected to conditions in some respects similar to those occurring in the engine. Such apparatus includes a pressure chamber into which the plug is connected and which has a transparent window for observation of the spark. There is also a supply line for introducing compressed air into the chamber with a control valve for regulating the pressure and a gauge for indicating the pressure. The apparatus further includes a transformer by which current of standard voltage, such as 110 volts, is transformed to the voltage proper for use in the ignition system, together with a high voltage conductor for connection to the spark plug under test. Such apparatus while capable of testing spark plugs when removed from the engine does not necessarily indicate that the operation must be satisfactory in the engine. This is for the reason that failure may be due to no fault in the plug but to other conditions such as an imperfect coil, inoperative breaker contacts or other defects in the ignition circuit. It is therefore the primary object of the present invention to obtain a construction of apparatus that may be used for testing all parts of the ignition circuit and to this end the invention consists in the construction as hereinafter set forth.

In the drawings:

Fig. 1 is an elevation of the testing apparatus;

Fig. 2 is a cross section therethrough;

Fig. 3 is a diagram illustrating the electrical devices and connections within the apparatus;

Figs. 4, 5 and 6 are diagrams illustrating the manner of using the testing instrument for testing various parts of an ignition system.

In common with other testing instruments heretofore used, my improved tester comprises a casing A containing therein an air chamber B having on its front face a plurality of threaded openings C for receiving the spark plugs to be tested and a transparent window C' on its rear side, an inclined reflector D in rear of said window, and a transparent window D' in the top of the casing through which the reflection in the mirror of the sparking of the plugs may be inspected. Compressed air is introduced into the chamber through a tubing E which may be connected with any suitable source and a valve F regulates the air so introduced to any pressure desired. Within another portion of the casing A is arranged a transformer G for suitably reducing the voltage as for instance from 110 to 8. There is also within this portion of the housing a standard coil H for transforming the low voltage to the high voltage to be used in the ignition circuit. A flexible cable I serves to connect the high tension circuit with the spark plug under test and a switch J controls the passage of current through this cable. A connector cord J' connects the primary of the transformer G to an electrical service. Thus to test a spark plug it is only necessary to gradually raise the pressure of air within the chamber B while the high tension current is passed through the plug and the sparking between the electrodes is observed through the window C'. When a pressure is reached at which the sparking ceases, this pressure is observed on the gauge and if it is not up to a predetermined point it will indicate a defective plug.

As above stated, the apparatus thus far described has been heretofore used but is only capable of testing plugs, and not the condition of other parts of the ignition system. Thus if a plug is removed from the engine and upon test shows satisfactory performance, there is no certainty that when replaced in the engine it will properly operate. We have therefore modified the construction so as to adapt the instrument for testing all parts of the ignition system.

To thus adapt the instrument for other tests provision is made for cutting into the electric circuit within the instrument at various points. This is accomplished by providing a series of terminal posts L, L', L² and L³ extending outside the casing at one side thereof. The posts L and L' are cut into the low voltage circuit M which is between the transformer G and the coil H. These posts are normally coupled to each other by a bridge connector N so as to complete the circuit M but for certain tests this bridge contact may be removed and other connections made to the post. The posts L² and L³ are cut into the high tension circuit O of the coil H and which includes the cable I for connection with the spark plug. These posts L² and L³ are also normally coupled to each other by a bridge connection N' but for certain tests this connector is removed and other connections made to the post.

Fig. 4 illustrates the use of the instrument for testing the entire ignition system. For this test the ignition cable for one of the spark plugs is removed therefrom and is connected by a conductor P to the post L³, the bridge connector N' being removed. A second connector cable P' connects the post L' with the ground for the engine circuit. A new spark plug having the spark gap properly adjusted as for instance .025 inch, is placed in the tester and connected to the tester cable I. Additional plugs are placed in the other openings D so as to close the same.

The switch J is turned off after which the engine is started and the operator observes the sparking of the plug Q through the window C'. The valve F is then gradually opened to admit air to the chamber B and to raise the pressure therein. The operator then observes the action of the plug and when the sparking cuts off or becomes unsteady, the pressure on the gauge is observed. If this has not attained a normal height it indicates a defect in the ignition system of the engine instead of a defect in the removed plug.

Another test that can be made with the instrument is illustrated in Fig. 5. Here the bridge connector N' is removed and the cable P connects the post L² to the center post of the distributor, the ignition circuit of the engine is opened, the switch J is closed and the high tension current from the coil H is thus delivered to the distributor. If the engine operates satisfactorily under this test any defective operation previously noticed is probably due to ignition trouble connected with the battery and breaker circuits.

Another test which can be made with the instrument is for determining a defect in the condenser. For this test shown in Fig. 6 the distributor head is removed, the ignition circuit of the engine opened, a piece of paper or card board is inserted between the two breaker contacts as indicated at R. The bridge connector N is then removed, the posts L and L' are connected by conductor cables S and S' to the breaker circuit and the switch J is then closed. If the condenser is defective or short circuited current will flow through the primary circuit M which will cause a sparking of the plug. On the other hand if the condenser is in proper condition no current will flow through the primary circuit and there will be no sparking at the plug. An equivalent test is to place a tail light bulb in a lamp test socket T connected in a shunt M' of the circuit M, which, if the bulb is illuminated will indicate a defective condenser.

My improved testing instrument can thus be used for a variety of tests other than the testing of the spark plugs, so as to quickly locate any defect in the engine ignition system.

What I claim as my invention is:

1. An ignition system testing instrument comprising a casing containing an air chamber and a sparking coil having low and high tension circuits therethrough, means for energizing said coil, a socket for a spark plug, a spark plug in said socket having its sparking electrodes located in said air chamber, means for connecting said spark plug into the high tension circuit of said coil, a switch controlling the low tension circuit of said coil, means for admitting compressed air to said chamber to vary the pressure therein, a transparent window in said air chamber through which the sparking of the electrodes may be observed, a graduated gauge for indicating the varying air pressures within said chamber, and means external to said casing for conveniently cutting in an external test circuit into a circuit of said coil.

2. An ignition system testing instrument comprising a casing containing an air chamber and a sparking coil having low and high tension circuits therethrough, means for energizing said coil, a socket for a spark plug, a spark plug in said socket having its sparking electrodes located in said air chamber, means for connecting said spark plug into the high tension circuit of said coil, a switch controlling the low tension circuit of said coil, means for admitting compressed air to said chamber to vary the pressure therein, a transparent window in said air chamber through which the sparking of the electrodes may be observed, a graduated gauge for indicating the varying air pressures within said chamber, and means external to said casing for conveniently cutting an external test circuit into either the primary or secondary circuits of said coil.

3. An ignition system testing instrument comprising a casing containing an air chamber and a sparking coil having low and high tension circuits therethrough, means for energizing said coil, a socket for a spark plug, a spark plug in said socket having its sparking electrodes located in said air chamber, means for connecting said spark plug into the high tension circuit of said coil, a switch controlling the low tension circuit of said coil, means for admitting compressed air to said chamber to vary the pressure therein, a transparent window in said air chamber through which the sparking of the electrodes may be observed, a graduated gauge for indicating the varying air pressures within said chamber, posts extending out through said casing cut in to a circuit of said coil, a bridge connector for normally closing said circuit of the coil movable to open said circuit and means for alternatively connecting an external circuit through said posts into the circuit of said coil when said bridge is removed.

4. An ignition system testing instrument comprising a casing containing an air chamber and a sparking coil having low and high tension circuits therethrough, means for energizing said coil, a socket for a spark plug, a spark plug in said socket having its sparking electrodes located in said air chamber, means for connecting said spark plug into the high tension circuit of said coil, a switch controlling the low tension circuit of said coil, means for admitting compressed air to said chamber to vary the pressure therein, a transparent window in said air chamber through which the sparking of the electrodes may be observed, a graduated gauge for indicating the varying air pressures within said chamber, pairs of posts extending outward through said casing and respectively cut into the low tension and high tension circuits of said coil, bridge connectors for connecting the posts of each pair to complete the circuits thereof, said bridge being removable to open the circuit, and means for connecting one or more of said posts with an external circuit to cut the same in to a circuit of the coil when said bridge is removed.

5. An ignition system testing instrument comprising a casing containing an air chamber and a sparking coil having low and high tension circuits therethrough, a step-down transformer also within said casing, a socket for a spark plug, a spark plug in said socket having its sparking electrodes located in said air chamber, means for connecting said spark plug into the high tension circuit of said coil, means for connecting the low tension circuit of said transformer to the low tension circuit of the coil, a switch controlling the high tension circuit of said transformer, means for admitting compressed air to said chamber to vary the pressure therein, a transparent window in said air chamber through which the sparking of the electrode may be observed, a graduated gauge for indicating the varying air pressures within said chamber and means external to said casing for conveniently cutting in an external circuit into a circuit of said coil.

6. An ignition system testing instrument comprising a casing containing an air chamber, a sparking coil having a low and high tension circuits therethrough, means for energizing said coil, a socket for a spark plug, a spark plug in said socket having its sparking electrodes located in said air chamber, a step-down transformer having its low tension circuit connecting with the low tension circuit of said coil, a switch controlling the high tension circuit of said transformer located external to the casing, means for admitting compressed air to said chamber to vary the pressure therein, a transparent window in said air chamber through which the sparking of electrodes may be observed, a graduated gauge for indicating the varying air pressure within said chamber, means for connecting said spark plug into the high tension circuit of said coil, two pairs of posts extending outward through said casing, one pair being connected in to the low tension circuit of said transformer and coil and the other pair being connected in to the high tension circuit of said coil and spark plug and detachable bridge connectors for normally closing the circuit between the posts of each pair.

FRANK BARTELS.